(12) United States Patent
Hashimoto

(10) Patent No.: US 9,919,418 B2
(45) Date of Patent: Mar. 20, 2018

(54) PIEZOELECTRIC DRIVING DEVICE, ROBOT, AND DRIVING METHOD OF THE SAME

(71) Applicant: Seiko Epson Corporation, Tokyo (JP)

(72) Inventor: Yasuharu Hashimoto, Minamiminowa (JP)

(73) Assignee: Seiko Epson Corporation (JP)

( * ) Notice: Subject to any disclaimer, the term of this patent is extended or adjusted under 35 U.S.C. 154(b) by 387 days.

(21) Appl. No.: 14/824,225

(22) Filed: Aug. 12, 2015

(65) Prior Publication Data

US 2016/0049886 A1 Feb. 18, 2016

(30) Foreign Application Priority Data

Aug. 13, 2014 (JP) ................................. 2014-164630

(51) Int. Cl.

| H01L 41/047 | (2006.01) |
|---|---|
| H01L 41/053 | (2006.01) |
| H01L 41/09 | (2006.01) |
| B25J 9/12 | (2006.01) |
| B25J 15/02 | (2006.01) |
| H02N 2/00 | (2006.01) |
| H02N 2/10 | (2006.01) |

(52) U.S. Cl.
CPC ............. B25J 9/12 (2013.01); B25J 15/0253 (2013.01); H02N 2/004 (2013.01); H02N 2/103 (2013.01); Y10S 901/23 (2013.01); Y10S 901/28 (2013.01); Y10S 901/29 (2013.01); Y10S 901/31 (2013.01)

(58) Field of Classification Search
USPC .... 310/316.01, 316.02, 317, 323.01–323.21, 310/328, 363
See application file for complete search history.

(56) References Cited

U.S. PATENT DOCUMENTS

| 7,224,102 B2 | 5/2007 | Miyazawa |
| 7,253,552 B2 | 8/2007 | Miyazawa et al. |
| 2012/0212100 A1* | 8/2012 | Lee ...................... H01L 41/053 310/317 |
| 2016/0049886 A1* | 2/2016 | Hashimoto ............ H02N 2/103 310/317 |
| 2016/0226401 A1* | 8/2016 | Arakawa ..................... B25J 9/06 |
| 2016/0226404 A1* | 8/2016 | Kajino .................. H01L 41/042 |
| 2016/0241165 A1* | 8/2016 | Miyazawa ............. H02N 2/004 |

FOREIGN PATENT DOCUMENTS

| JP | 2000-333480 A | 11/2000 |
| JP | 2001-230463 A | 8/2001 |
| JP | 2004-320979 A | 11/2004 |
| JP | 2005-005680 A | 1/2005 |
| JP | 2014-049903 A | 3/2014 |

* cited by examiner

*Primary Examiner* — Thomas Dougherty
(74) *Attorney, Agent, or Firm* — Harness, Dickey & Pierce, P.L.C.

(57) ABSTRACT

A piezoelectric driving device includes a vibrating plate, a first piezoelectric vibrating body which is disposed on the first surface of the vibrating plate; a second piezoelectric vibrating body which is disposed on the second surface of the vibrating plate; and a protrusion which is provided on the vibrating plate and comes into contact with a body to be driven, wherein the first piezoelectric vibrating body and the second piezoelectric vibrating body have asymmetry that the first piezoelectric vibrating body and the second piezoelectric vibrating body are asymmetrical to each other with respect to the vibrating plate.

20 Claims, 12 Drawing Sheets

NO DEVIATION BETWEEN VIBRATING
STRUCTURES 100a AND 100b

DEVIATION BETWEEN VIBRATING
STRUCTURES 100a AND 100b

PIEZOELECTRIC DRIVING DEVICE, ROBOT, AND DRIVING METHOD OF THE SAME

BACKGROUND

1. Technical Field

The present invention relates to a piezoelectric driving device, and various apparatuses such as a robot including a piezoelectric driving device.

2. Related Art

In the related art, a piezoelectric actuator (piezoelectric driving device) using a piezoelectric element has been known (for example, see JP-A-2004-320979). A basic configuration of this piezoelectric driving device is a configuration in which four piezoelectric elements are arranged on each of two surfaces of a reinforcing plate to have two rows and two columns, and accordingly, eight piezoelectric elements in total are provided on both sides of the reinforcing plate. Each piezoelectric element is a unit in which a piezoelectric body is interposed between two electrodes and the reinforcing plate is also used as one electrode of the piezoelectric element. A protrusion which comes into contact with a rotor, which is a body to be driven, to rotate the rotor is provided on one end of the reinforcing plate. When the AC voltage is applied to two piezoelectric elements diagonally disposed among the four piezoelectric elements, the two piezoelectric elements perform an expansion and contraction operation, and accordingly, the protrusion of the reinforcing plate performs a reciprocal operation or an elliptic operation. The rotor, which is a body to be driven, rotates in a predetermined rotation direction according to the reciprocal operation or the elliptic operation of the protrusion of the reinforcing plate. In addition, it is possible to rotate the rotor in a reverse direction, by switching the two piezoelectric elements to be targets of application of the AC voltage, with the other two piezoelectric elements.

However, the inventors of this specification have found that abrasion is concentrated on a contact point where a protrusion comes into contact with a body to be driven in the piezoelectric driving device of the related art and the protrusion may be excessively wasted. Such a problem has become significant particularly when using a thin film piezoelectric element (piezoelectric body) in order to miniaturize the piezoelectric driving device.

SUMMARY

An advantage of some aspects of the invention is to solve at least a part of the problems described above, and the invention can be implemented as the following forms or application examples.

(1) An aspect of the invention provides a piezoelectric driving device including: a vibrating plate including a first surface and a second surface; a first piezoelectric vibrating body which includes a first piezoelectric element and is disposed on the first surface of the vibrating plate; a second piezoelectric vibrating body which includes a second piezoelectric element and is disposed on the second surface of the vibrating plate; and a protrusion which is provided on the vibrating plate and comes into contact with a body to be driven wherein the first piezoelectric vibrating body and the second piezoelectric vibrating body have asymmetry that the first piezoelectric vibrating body and the second piezoelectric vibrating body are asymmetrical to each other with respect to the vibrating plate.

According to the piezoelectric driving device, since the first piezoelectric vibrating body and the second piezoelectric vibrating body have asymmetry that the first piezoelectric vibrating body and the second piezoelectric vibrating body are asymmetrical to each other with respect to the vibrating plate, a position of a contact point where the protrusion comes into contact with a body to be driven, is changed, and as a result, it is possible to reduce the concentration of abrasion of the protrusion.

(2) In the piezoelectric driving device according to the aspect described above, when a longitudinal direction is set as a first direction and a transverse direction is set as a second direction orthogonal to the first direction with respect to the first piezoelectric vibrating body, the vibrating plate, and the second piezoelectric vibrating body, the asymmetry of the first piezoelectric vibrating body and the second piezoelectric vibrating body may include a case where the first piezoelectric vibrating body and the second piezoelectric vibrating body are disposed in positions deviated from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

With this configuration, since the first piezoelectric vibrating body and the second piezoelectric vibrating body are deviated from each other, it is possible to reduce the concentration of abrasion of the protrusion.

(3) In the piezoelectric driving device according to the aspect described above, the asymmetry of the first piezoelectric vibrating body and the second piezoelectric vibrating body may include a case where the first piezoelectric vibrating body and the second piezoelectric vibrating body are disposed in positions deviated from each other by 5 μm to 30 μm in the first direction.

With this configuration, since the first piezoelectric vibrating body and the second piezoelectric vibrating body are disposed in positions deviated in the first direction which is a longitudinal direction, it is possible to increase a deformation amount in a third direction (lamination direction) due to this deviation and to reduce the concentration of abrasion of the protrusion. In addition, since the deviation amount is in a range of 5 μm to 30 μm, it is possible to sufficiently reduce the concentration of abrasion and to prevent excessive deformation due to the deviation.

(4) In the piezoelectric driving device according to the aspect described above, the asymmetry of the first piezoelectric vibrating body and the second piezoelectric vibrating body may include a case where the first piezoelectric vibrating body and the second piezoelectric vibrating body are disposed in positions deviated from each other by 5 μm to 30 μm in the second direction.

With this configuration, since the first piezoelectric vibrating body and the second piezoelectric vibrating body are disposed in positions deviated in the second direction which is a transverse direction, the positions of nodes of vibration of the piezoelectric driving device on a surface including the first direction and the second direction are not affected by this deviation, and therefore, it is possible to alleviate effects of a vibration decrease due to the deviation. In addition, since the deviation amount is in a range of 5 μm to 30 μm, it is possible to sufficiently reduce the concentration of abrasion and to prevent excessive deformation due to the deviation.

(5) In the piezoelectric driving device according to the aspect described above, when a longitudinal direction is set as a first direction and a transverse direction is set as a second direction orthogonal to the first direction with respect to with respect to the first piezoelectric vibrating body, the vibrating plate, and the second piezoelectric vibrating body, the asymmetry of the first piezoelectric vibrating body and the second piezoelectric vibrating body may include a case where the first piezoelectric element and the second piezoelectric element are disposed in positions deviated from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

With this configuration, since the first piezoelectric element and the second piezoelectric element are deviated from each other, it is possible to reduce the concentration of abrasion of the protrusion.

(6) In the piezoelectric driving device according to the aspect described above, when a longitudinal direction is set as a first direction and a transverse direction is set as a second direction orthogonal to the first direction with respect to the first piezoelectric vibrating body, the vibrating plate, and the second piezoelectric vibrating body, the asymmetry of the first piezoelectric vibrating body and the second piezoelectric vibrating body may include a case where the first piezoelectric element and the second piezoelectric element have lengths different from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

With this configuration, since the first piezoelectric element and the second piezoelectric element have lengths different from each other, it is possible to reduce the concentration of abrasion of the protrusion.

(7) In the piezoelectric driving device according to the aspect described above, the first piezoelectric vibrating body may include a first substrate and the first piezoelectric element which is formed on the first substrate, the second piezoelectric vibrating body may include a second substrate and the second piezoelectric element which is formed on the second substrate, and, when a longitudinal direction is set as a first direction and a transverse direction is set as a second direction orthogonal to the first direction with respect to the first piezoelectric vibrating body, the vibrating plate, and the second piezoelectric vibrating body, the asymmetry of the first piezoelectric vibrating body and the second piezoelectric vibrating body may include a case where the first substrate and the second substrate are disposed in positions deviated from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

With this configuration, since the first substrate and the second substrate are deviated from each other, it is possible to reduce the concentration of abrasion of the protrusion.

(8) In the piezoelectric driving device according to the aspect described above, the first piezoelectric vibrating body may include a first substrate and the first piezoelectric element which is formed on the first substrate, the second piezoelectric vibrating body may include a second substrate and the second piezoelectric element which is formed on the second substrate, and when a longitudinal direction is set as a first direction and a transverse direction is set as a second direction orthogonal to the first direction with respect to the first piezoelectric vibrating body, the vibrating plate, and the second piezoelectric vibrating body, the asymmetry of the first piezoelectric vibrating body and the second piezoelectric vibrating body may include a case where the first substrate and the second substrate have lengths different from each other in at least one direction of the first direction and the second direction, when a laminated structure configured with the first piezoelectric vibrating body, the vibrating plate, and the second piezoelectric vibrating body is seen in a third direction which is a lamination direction of the laminated structure.

With this configuration, since the first substrate and the second substrate have lengths different from each other, it is possible to reduce the concentration of abrasion of the protrusion.

(9) In the piezoelectric driving device according to the aspect described above, the piezoelectric body may have a thickness of 0.5 μm to 20 μm.

With this configuration, when the thickness of the piezoelectric body is in a range of 0.5 μm to 20 μm, that is, a thin film the concentration of abrasion of the protrusion is significant, and therefore, the alleviation effect thereof is more significant.

(10) In the piezoelectric driving device according to the aspect described above, the piezoelectric body may have a thickness of 0.5 μm to 3 μm.

With this configuration, the alleviation effect of abrasion of the protrusion is more significant, compared to a case where the thickness of the piezoelectric body exceeds 3 μm.

The invention can be implemented in various forms, and, for example, can be implemented in various embodiments of various apparatuses, a driving method thereof such as a driving method of a piezoelectric driving device, a manufacturing method of a piezoelectric driving device, and a robot including a piezoelectric driving device mounted thereon, in addition to the piezoelectric driving device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
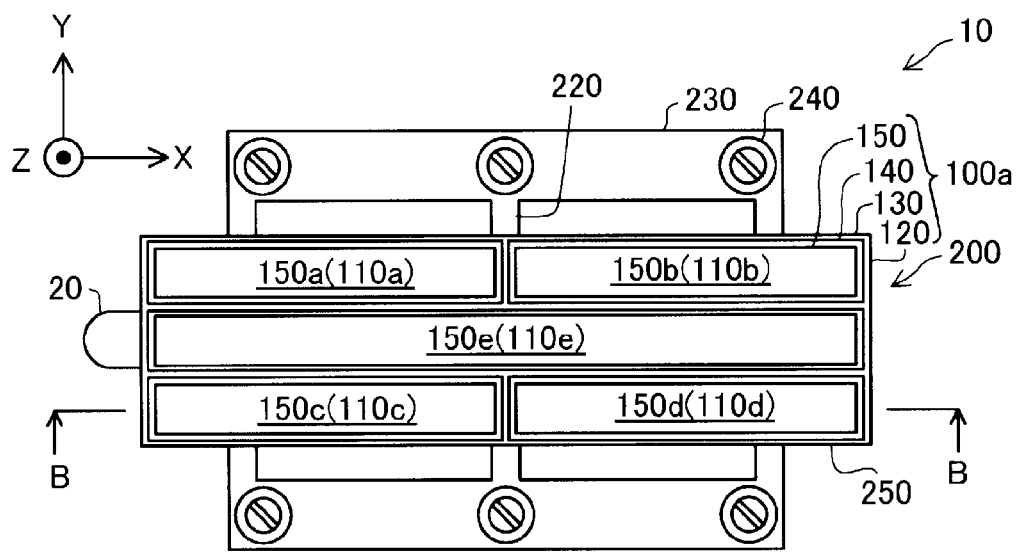
FIGS. 1A and 1B are respectively a plan view and a sectional view showing a schematic configuration of a piezoelectric driving device of a first embodiment.
Figure 1B:
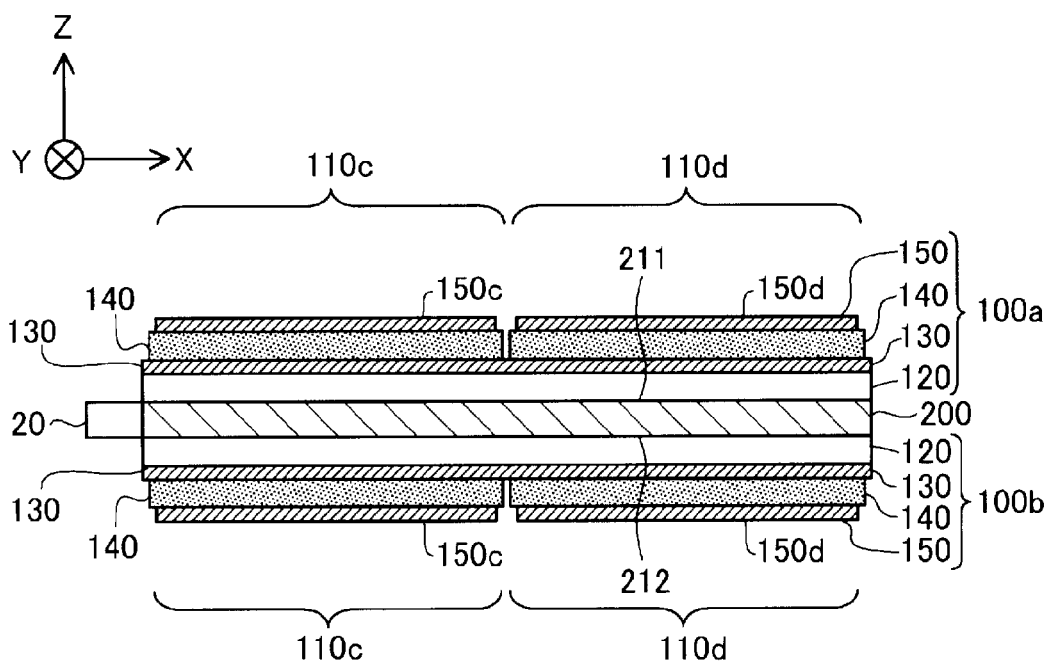

FIG. 1A is a plan view showing a schematic configuration of a piezoelectric driving device 10 of a first embodiment of the invention and FIG. 1B is a sectional view taken along line B-B. A piezoelectric driving device 10 includes a vibrating plate 200, and two piezoelectric vibrating bodies 100a and 100b respectively disposed on both surfaces (a first surface 211 and a second surface 212) of the vibrating plate 200. Each of the piezoelectric vibrating bodies 100a and 100b include a substrate 120, a first electrode 130 formed on the substrate 120, a piezoelectric body 140 formed on the first electrode 130, and a second electrode 150 formed on the piezoelectric body 140. The piezoelectric body 140 is interposed between the first electrode 130 and the second electrode 150. The two piezoelectric vibrating bodies 100a and 100b have asymmetry that the piezoelectric vibrating bodies 100a and 100b are asymmetrical to each other with respect to the vibrating plate 200. This asymmetry will be described later. Herein, in FIG. 1B, for convenience of description, the two piezoelectric vibrating bodies 100a and 100b are shown as elements having the same structure and disposition configuration. Since the two piezoelectric vibrating bodies 100a and 100b have the same configuration, the configuration of the first piezoelectric vibrating body 100a on the upper side of the vibrating plate 200 will be described, unless otherwise noted. The piezoelectric vibrating bodies are collectively referred to as the "piezoelectric vibrating body 100", when it is not necessary to distinguish the two piezoelectric vibrating bodies 100a and 100b. In FIGS. 1A and 1B and other drawings which will be described later, a longitudinal direction (first direction) of the vibrating plate 200 or the piezoelectric vibrating body 100 is set as an X direction, a transverse direction (second direction) thereof is set as a Y direction, and a lamination direction (third direction) of the laminated structure thereof is set as a Z direction. The three directions X, Y, Z are directions orthogonal to each other.

The substrate 120 of the piezoelectric vibrating body 100 is used as a substrate for forming the first electrode 130, the piezoelectric body 140, and the second electrode 150 in a film forming process. The substrate 120 also has a function as a vibrating plate which performs mechanical vibration. The substrate 120 can be formed of Si, $Al_2O_3$, or $ZrO_2$, for example. As the substrate 120 formed of Si, a Si wafer for semiconductor manufacturing can be used, for example. In the embodiment, a planar shape of the substrate 120 is a rectangle. A thickness of the substrate 120 is, for example, preferably in a range of 10 μm to 100 μm. When the thickness of the substrate 120 is equal to or greater than 10 μm, it is possible to comparatively easily treat the substrate 120, at the time of performing a film forming process on the substrate 120. When the thickness of the substrate 120 is equal to or smaller than 100 μm, it is possible to easily vibrate the substrate 120 according to expansion and contraction of the piezoelectric body 140 formed of a thin film.

The first electrode 130 is formed as one continuous conductor layer which is formed on the substrate 120. Meanwhile, as shown in FIG. 1A, the second electrode 150 is divided into five conductor layers 150a to 150e (also referred to as "second electrodes 150a to 150e"). The second electrode 150e in the center is formed to have a rectangular shape over substantially all of the substrate 120 in a longitudinal direction, in the center of the substrate 120 in a width direction. The other four second electrodes 150a, 150b, 150c, and 150d have the same planar shape and are formed at four corners of the substrate 120. In the example of FIGS. 1A and 1B, both the first electrode 130 and the second electrode 150 have a rectangular planar shape. The first electrode 130 or the second electrode 150 is a thin film which is formed by sputtering, for example. As a material of the first electrode 130 or the second electrode 150, any material having high conductivity such as Al (aluminum), Ni (nickel), Au (gold), Pt (platinum), or Ir (iridium) can be used, for example. In addition, instead of setting the first electrode 130 as one continuous conductor layer, the first electrode may be divided into five conductor layers having planar shapes which are substantially the same as those of the second electrodes 150a to 150e. Wiring (or a wiring layer or an insulating layer) for electrically connecting the second electrodes 150a to 150e with each other and wiring (or a wiring layer or an insulating layer) for electrically connecting the first electrode 130, the second electrodes 150a to 150e, and a driving circuit with each other are not shown in FIGS. 1A and 1B.

The piezoelectric body 140 is formed as five piezoelectric layers having planar shapes which are substantially the same as those of the second electrodes 150a to 150e. Instead of that, the piezoelectric body 140 may be formed as one continuous piezoelectric layer having a planar shape substantially the same as that of the first electrode 130. Five piezoelectric elements 110a to 110e (FIG. 1A) are configured by the laminated structure of the first electrode 130, the piezoelectric body 140, and the second electrodes 150a to 150e.

The piezoelectric body 140 is a thin film which is formed by a sol-gel method or a sputtering method, for example. As a material of the piezoelectric body 140, any material exhibiting a piezoelectric effect such as ceramics having an $ABO_3$ type perovskite structure can be used. Examples of the ceramics having an $ABO_3$ type perovskite structure include lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, zinc niobate lead, and scandium niobate. As a material exhibiting a piezoelectric effect other than the ceramics, polyvinylidene fluoride or crystal can also be used, for example. A thickness of the piezoelectric body 140 is, for example, preferably in a range of 50 nm (0.05 μm) to 20 μm. A thin film of the piezoelectric body 140 having a thickness of this range can easily be formed by using a film forming process. When the thickness of the piezoelectric body 140 is equal to or greater than 0.05 μm, it is possible to generate sufficiently great power according to expansion and contraction of the piezoelectric body 140. When the thickness of the piezoelectric body 140 is equal to or smaller than 20 μm, it is possible to sufficiently miniaturize the piezoelectric driving device 10.

Figure 2:
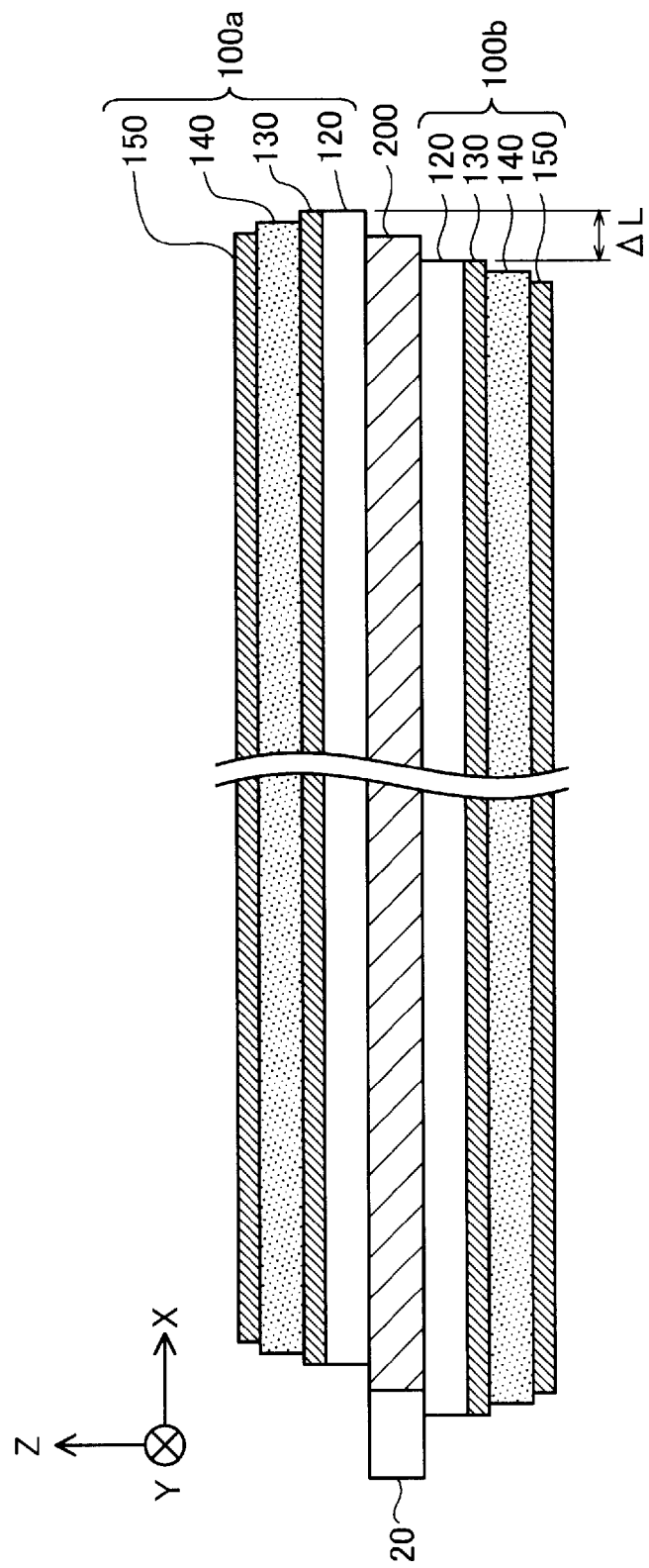
FIG. 2 is an explanatory diagram showing an example of asymmetry of piezoelectric vibrating bodies.

FIG. 2 is an explanatory diagram showing an example of asymmetry of the two piezoelectric vibrating bodies 100a and 100b. In this example, a point in which the two piezoelectric vibrating bodies 100a and 100b are deviated from each other by a deviation amount ΔL in the X direction, is referred to as the asymmetry of the two piezoelectric vibrating bodies. The deviation amount ΔL is, for example, preferably from 5 μm to 30 μm and more preferably from 10 μm to 30 μm. By deviating the two piezoelectric vibrating bodies by the deviation amount ΔL in the X direction (longitudinal direction), upper and lower forces of the vibrating plate 200 become unbalanced, vibration in a thickness direction of the vibrating plate 200 occurs, a position of a contact point where the protrusion 20 provided on the end portion of the vibrating plate 200 comes into contact with a body to be driven, is changed, and accordingly, it is possible to reduce the concentration of abrasion of the protrusion 20. The structure or the dimensions of the two piezoelectric vibrating bodies 100a and 100b is the same. In this specification, an expression that "dimensions of the two elements are the same" means that a difference in dimensions of the two elements is less than 5 μm.

Figure 3:
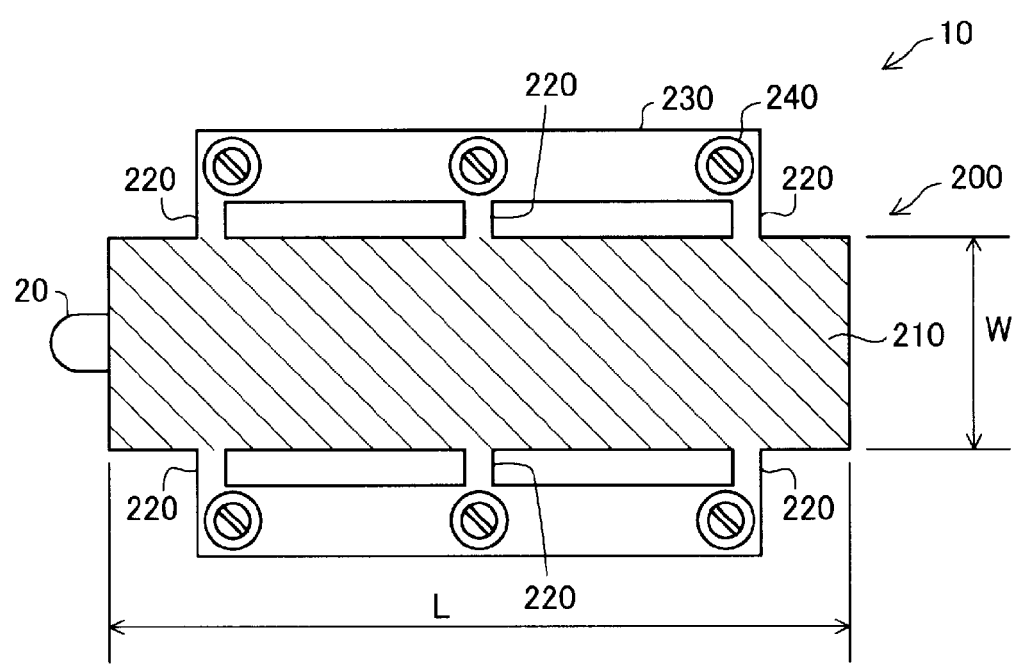
FIG. 3 is a plan view of a vibrating plate.

FIG. 3 is a plan view of the vibrating plate 200. The vibrating plate 200 includes a rectangular vibrator portion 210, three connection portions 220 which extend from right and left long sides of the vibrator portion 210, and two attachment portions 230 which are connected to the respective three connection portions 220 on both right and left sides. In FIG. 3, for convenience of description, an area of the vibrator portion 210 is hatched. The attachment portions 230 are used for attaching the piezoelectric driving device 10 to another member with screws 240. The vibrating plate 200, for example, can be formed with a metal material such as stainless steel, aluminum, an aluminum alloy, titanium, a titanium alloy, copper, a copper alloy, or an iron-nickel alloy.

The piezoelectric vibrating bodies 100a and 100b (FIGS. 1A and 1B) are respectively mounted on an upper surface (first surface) and a lower surface (second surface) of the vibrator portion 210 using an adhesive. A ratio of a length L and a width W of the vibrator portion 210 is preferably approximately L:W=7:2. This ratio is a preferable value for performing ultrasonic vibration (which will be described later) in which the vibrator portion 210 curves to the right and left along the flat surface thereof. The length L of the vibrator portion 210 can be set, for example, in a range of 3.5 mm to 30 mm and the width W thereof can be set, for example, in a range of 1 mm to 8 mm. Since the vibrator portion 210 performs ultrasonic vibration, the length L thereof is preferably equal to or smaller than 50 nm. A thickness of the vibrator portion 210 (thickness of vibrating plate 200) can be set, for example, in a range of 50 μm to 700 μm. When the thickness of the vibrator portion 210 is equal to or greater than 50 μm, sufficient rigidity for supporting the piezoelectric vibrating body 100 is obtained. When the thickness of the vibrator portion 210 is equal to or smaller than 700 μm, sufficiently great deformation can occur according to deformation of the piezoelectric vibrating body 100.

A protrusion 20 (also referred to as a "contacting portion" or an "operating portion") is provided on one short side of the vibrating plate 200. The protrusion 20 is a member which comes into contact with a body to be driven to apply force to a body to be driven. The protrusion 20 is preferably formed of a material having durability such as ceramics (for example, $Al_2O_3$).

Figure 4:
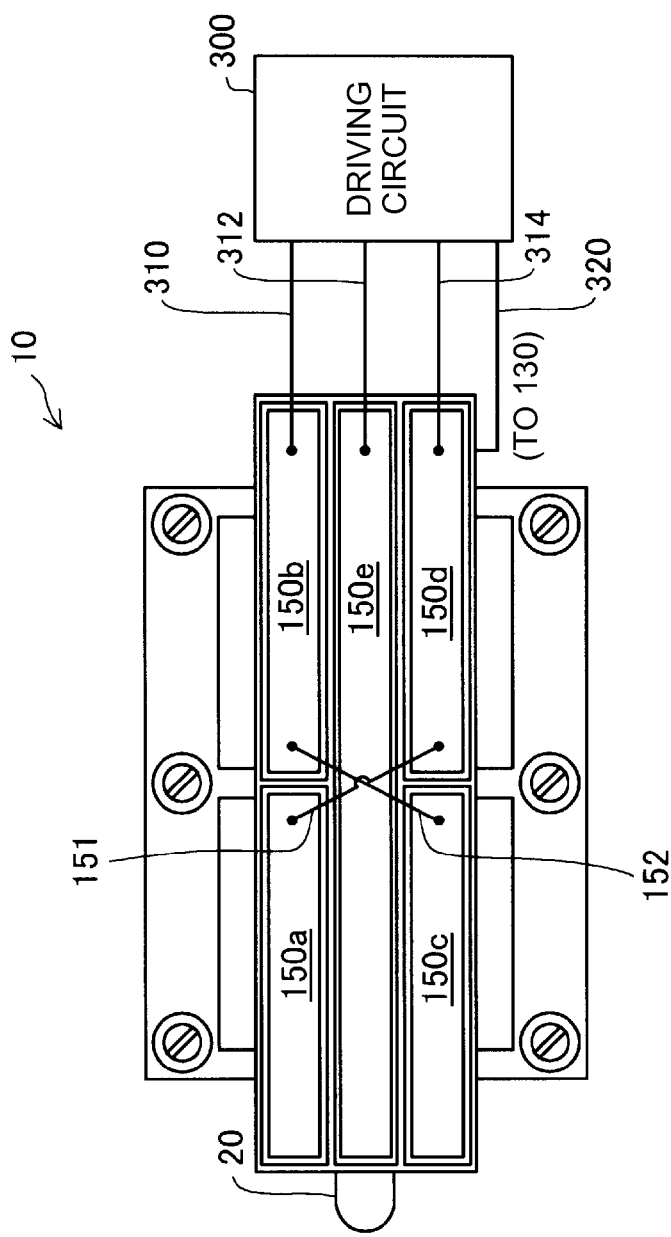
FIG. 4 is an explanatory diagram showing an electrical connection state of the piezoelectric driving device and a driving circuit.

FIG. 4 is an explanatory diagram showing an electrical connection state of the piezoelectric driving device 10 and a driving circuit 300. Among the five second electrodes 150a to 150e, a pair of diagonal second electrodes 150a and 150d are electrically connected to each other through a wiring 151, and another pair of diagonal second electrodes 150b and 150c are also electrically connected to each other through a wiring 152. The wirings 151 and 152 may be formed by a film forming process or may be implemented by wire-shaped wiring. The three second electrodes 150b, 150e, and 150d disposed on the right side of FIG. 4 and the first electrode 130 (FIGS. 1A and 1B) are electrically connected to the driving circuit 300 through wirings 310, 312, 314, and 320. By applying an AC voltage or an undulating voltage which periodically changes, between a pair of second electrodes 150a and 150d and the first electrode 130, the driving circuit 300 can cause the piezoelectric driving device 10 to perform ultrasonic vibration and rotate a rotor (body to be driven) which comes into contact with the protrusion 20, in a predetermined rotation direction. Herein, the "undulating voltage" means a voltage obtained by applying DC offset to the AC voltage, and a direction of the voltage (electric field) thereof is a direction from one electrode to the other electrode. In addition, by applying an AC voltage or an undulating voltage between another pair of second electrodes 150b and 150c and the first electrode 130, a rotor which comes into contact with the protrusion 20 can be rotated in a reverse direction. The application of the voltage can be simultaneously performed on the two piezoelectric vibrating bodies 100 provided on both surfaces of the vibrating plate 200. A wiring (or a wiring layer or an insulating layer) configuring the wirings 151, 152, 310, 312, 314, and 320 shown in FIG. 4 is not shown in FIGS. 1A and 1B.

Figure 5A:
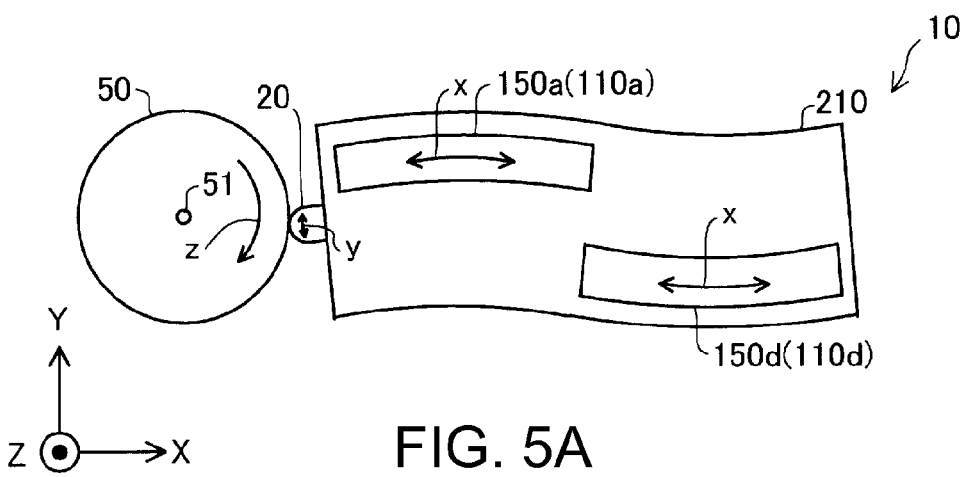
FIGS. 5A to 5C are explanatory diagrams showing an example of operations of the piezoelectric driving device.

FIG. 5A is an explanatory diagram showing an example of operations of the piezoelectric driving device 10. The protrusion 20 of the piezoelectric driving device 10 comes into contact with an outer circumference of a rotor 50 which is a body to be driven. In an example shown in FIG. 5A, the driving circuit 300 (FIG. 4) applies an AC voltage or an undulating voltage between a pair of second electrodes 150a and 150d and the first electrode 130, and accordingly, the piezoelectric elements 110a and 110d expand or contract in a direction of an arrow x shown in FIG. 5A. According to this, the vibrator portion 210 of the piezoelectric driving device 10 curves in a XY plane of the vibrator portion 210 to be deformed in a meander shape (S shape), and a tip end of the protrusion 20 performs a reciprocal operation or an elliptic operation in a direction of an arrow y. As a result, the rotor 50 is rotated around the center 51 thereof in a predetermined direction z (clockwise in FIG. 5A). The three connection portions 220 (FIG. 3) of the vibrating plate 200 described in FIG. 3 are provided at a position of a node of vibration of the vibrator portion 210. When the driving circuit 300 applies an AC voltage or an undulating voltage between another pair of second electrodes 150b and 150c and the first electrode 130, the rotor 50 is rotated in a reverse direction. When the same voltage as that applied to a pair of second electrodes 150a and 150d (or another pair of second electrodes 150b and 150c) is applied to the second electrode 150e in the center, the piezoelectric driving device 10 expands or contracts in a longitudinal direction, and accordingly, it is possible to increase the magnitude of force applied to the rotor 50 from the protrusion 20. Such an operation regarding the piezoelectric driving device 10 (or piezoelectric vibrating body 100) is disclosed in JP-A-2004-320979 or U.S. Pat. No. 7,224,102 thereof, and the disclosed content thereof is incorporated by reference.

Figure 5B:
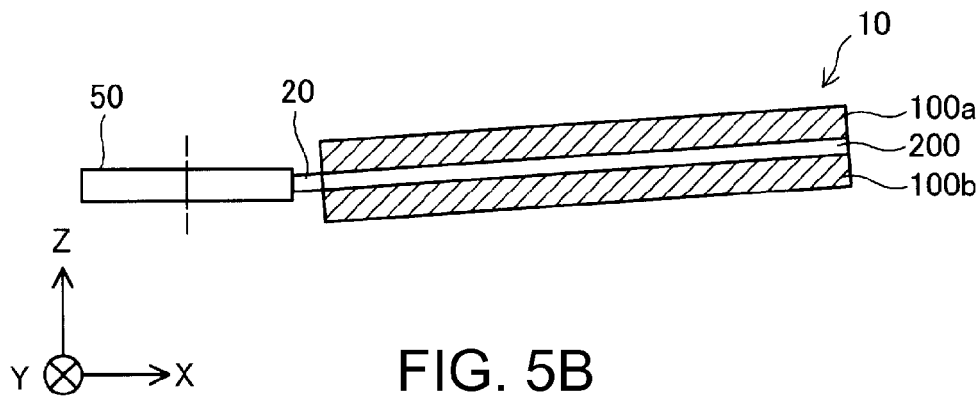

FIG. 5B shows a relationship between the piezoelectric driving device 10 and the rotor 50, when there is no deviation shown in FIG. 2 between the two piezoelectric vibrating bodies 100a and 100b. In this example, the piezoelectric driving device 10 is slightly inclined with respect to the XY plane and the protrusion 20 also comes into contact with the rotor 50 in a state of being slightly inclined. Herein, the inclination of the piezoelectric driving device 10 is drawn with exaggeration. When there is no deviation between the two piezoelectric vibrating bodies 100a and 100b, a contact point of the protrusion 20 which comes into contact with the rotor 50 is not substantially changed, and accordingly, the abrasion may be concentrated on the protrusion 20. Even when the protrusion 20 is not inclined with respect to the rotor 50, the abrasion may be concentrated on the protrusion 20, in the same manner as described above.

Figure 5C:
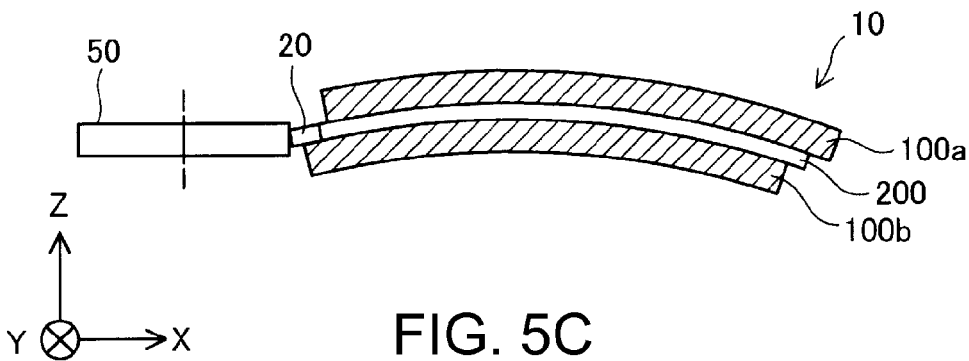

FIG. 5C shows a relationship between the piezoelectric driving device 10 and the rotor 50, when there is deviation shown in FIG. 2 between the two piezoelectric vibrating bodies 100a and 100b. In this example, since the two piezoelectric vibrating bodies 100a and 100b are deviated by the deviation amount ΔL in the X direction (longitudinal direction), upper and lower forces of the vibrating plate 200 are unbalanced and the vibrating plate 200 is curved in the thickness direction. In the example shown in FIG. 5C, the vibrating plate 200 is curved to be protruded upwards, but in practice, the vibrating plate 200 is vibrated so that a state of being protruded upwards and a state of being protruded downwards mutually appear. As a result, since a position of a contact point where the protrusion 20 provided on the end portion of the vibrating plate 200 comes into contact with a body to be driven, is changed, it is possible to reduce the concentration of abrasion of the protrusion 20. Therefore, durability or reliability of the protrusion 20 and the piezoelectric driving device 10 is also improved.

Figure 6A:
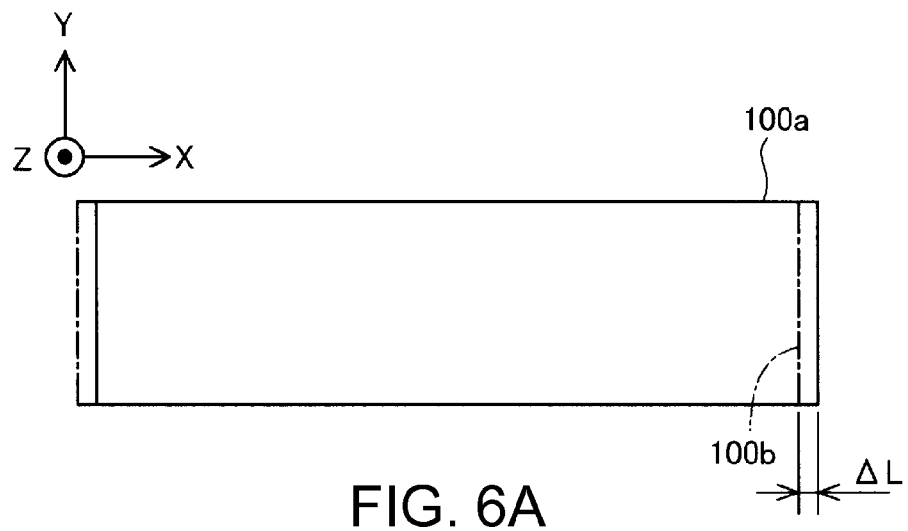
FIGS. 6A to 6C are explanatory diagrams showing an example of asymmetry due to deviation.
Figure 6B:
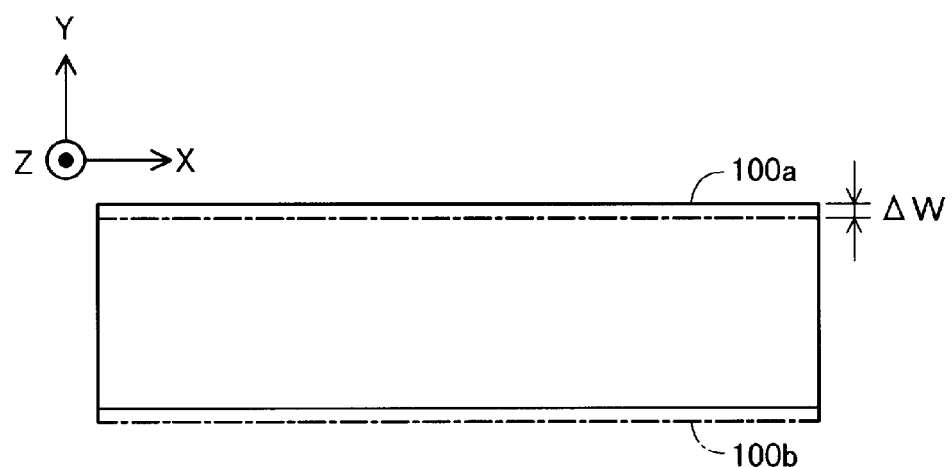
Figure 6C:
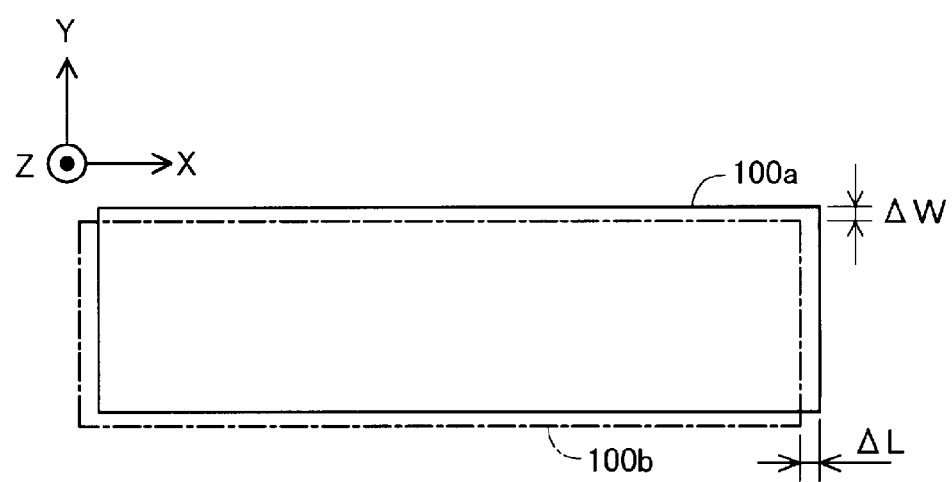

FIGS. 6A to 6C are explanatory diagrams showing an example of asymmetry due to deviation. FIG. 6A is an example in which the two piezoelectric vibrating bodies 100a and 100b are deviated from each other by the deviation amount ΔL in the X direction (longitudinal direction) and corresponds to the examples shown in FIG. 2 and FIG. 5C. FIG. 6B is an example in which the two piezoelectric vibrating bodies 100a and 100b are deviated from each other by the deviation amount ΔW in the Y direction (transverse direction). In this case, a curved direction of the vibrating plate 200 is different from the example shown in FIG. 5C by 90 degrees, however, in the same manner as a case where the piezoelectric vibrating bodies are deviated in the X direction, a position of a contact point of the protrusion 20 is changed, and accordingly, it is possible to reduce the concentration of abrasion of the protrusion 20. When the piezoelectric vibrating bodies are deviated in the Y direction, nodes of the vibration in the XY plane shown in FIG. 5A are not changed, and accordingly, it is possible to reliably support the nodes of the vibration with three connection portions 220 (FIG. 1A) respectively extended from the right and left side of the vibrating plate 200. Accordingly, this case is more preferable than the case where the piezoelectric vibrating bodies are deviated in the X direction (FIG. 6A), because vibration loss due to the deviation between the two piezoelectric vibrating bodies 100a and 100b does not substantially occur so that an effect of high efficiency is obtained. Meanwhile, when the piezoelectric vibrating bodies are deviated in the X direction, the curve of the vibrating plate 200 is great, and accordingly this case is preferable because it is possible to further reduce the concentration of abrasion of the protrusion 20, compared to the case where the piezoelectric vibrating bodies are deviated in the Y direction. FIG. 6C is an example where the piezoelectric vibrating bodies are deviated in both the X direction and the Y direction. In any example shown in FIGS. 6A to 6C, the deviation amount ΔL in the X direction and the deviation amount ΔW in the Y direction are preferably in a range of 5 μm to 30 μm and more preferably in a range of 10 μm to 30 μm. By setting the deviation amounts ΔL and ΔW to be in the range described above, it is possible to sufficiently alleviate the concentration of abrasion of the protrusion 20 and to prevent excessive deformation due to the deviation.

Figure 7A:
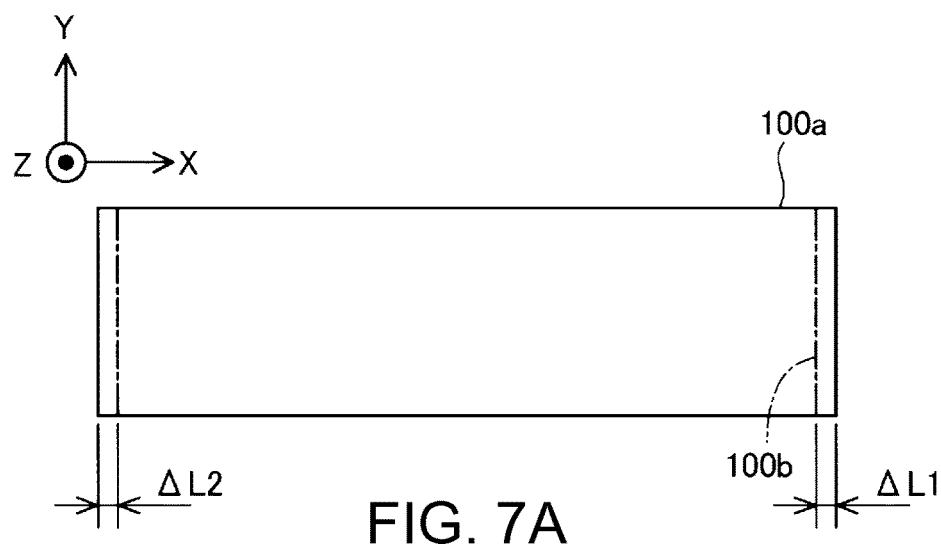
FIGS. 7A to 7C are explanatory diagrams showing an example of asymmetry due to a difference in dimensions.
Figure 7B:
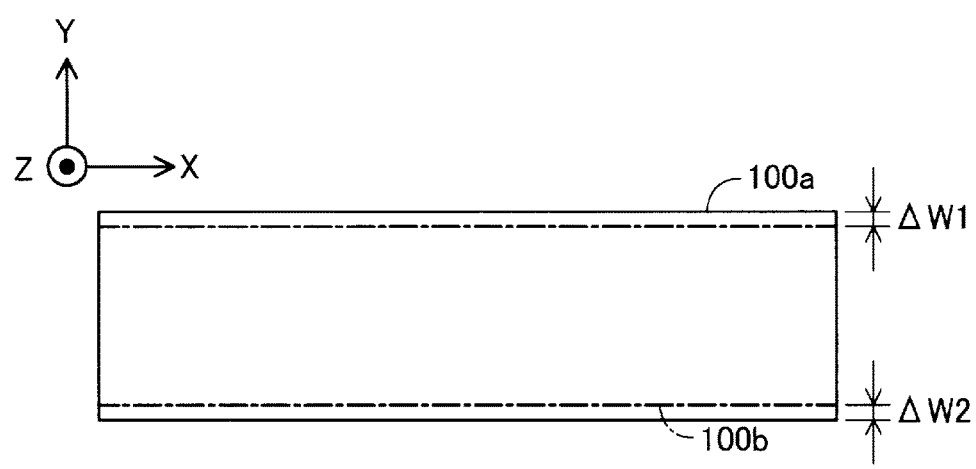
Figure 7C:
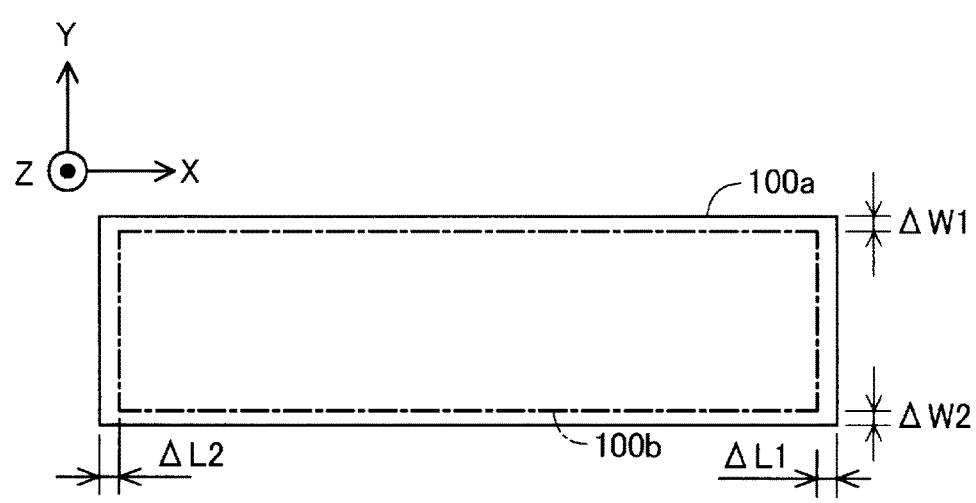

FIGS. 7A to 7C are explanatory diagrams showing an example of asymmetry due to a difference in dimensions. FIG. 7A is an example in which the two piezoelectric vibrating bodies 100a and 100b have a difference in dimensions in the X direction (longitudinal direction) (ΔL1+ΔL2). In this example, both ends of the second piezoelectric vibrating body 100b are present on the inner side compared to both ends of the first piezoelectric vibrating body 100a by the differences ΔL1 and ΔL2, and the difference in dimensions thereof is set as (ΔL1+ΔL2). Even in the case of FIG. 7A, in the same manner as in the case of FIG. 6A, a position of a contact point of the protrusion 20 is changed, and accordingly, it is possible to reduce the concentration of abrasion of the protrusion 20. FIG. 7B is an example in which the two piezoelectric vibrating bodies 100a and 100b have a difference in dimensions in the Y direction (longitudinal direction) (ΔW1+ΔW2). Even in this case, in the same manner as in the case of FIG. 6B, a position of a contact point of the protrusion 20 is changed, and accordingly, it is possible to reduce the concentration of abrasion of the protrusion 20. FIG. 7C is an example in which the piezoelectric vibrating bodies have differences in dimensions in both the X direction and the Y direction (ΔL1+ΔL2) and (ΔW1+ΔW2). A value of the difference in dimensions in the X direction (ΔL1+ΔL2) and the difference in dimensions in the Y direction (ΔW1+ΔW2) is preferably ½ of the value of the deviation amounts ΔL and ΔW shown in FIGS. 6A to 6C. That is, both the differences in dimensions (ΔL1+ΔL2) and (ΔW1+ΔW2) are preferably in a range of 10 μm to 60 μm and more preferably in a range of 20 μm to 60 μm. By performing the setting described above, in the same manner as in a case of the asymmetry due to the deviation shown in FIGS. 6A to 6C, it is possible to sufficiently alleviate the concentration of abrasion of the protrusion 20 and to prevent excessive deformation due to the difference in dimensions. A ratio of the differences in dimensions ΔL1 and ΔL2 of both ends in the X direction is arbitrarily set, but is preferably a value equal to or greater than 0. The same applies to the differences in dimensions ΔW1 and ΔW2 of both ends in the Y direction.

The asymmetry between the two piezoelectric vibrating bodies 100a and 100b can be exemplified as follows, including the examples shown in FIGS. 6A to 7C.

Example 1

The first piezoelectric vibrating body 100a and the second piezoelectric vibrating body 100b are disposed in positions deviated from each other in at least one direction of the X direction (longitudinal direction) and the Y direction (transverse direction) (FIGS. 6A to 6C).

Example 2

The first piezoelectric vibrating body 100a and the second piezoelectric vibrating body 100b have lengths different from each other in at least one direction of the X direction (longitudinal direction) and the Y direction (transverse direction) (FIGS. 7A to 7C).

Example 3

The piezoelectric element 110 of the first piezoelectric vibrating body 100a and the piezoelectric element 110 of the second piezoelectric vibrating body 100b are disposed in positions deviated from each other in at least one direction of the X direction (longitudinal direction) and the Y direction (transverse direction) (not shown).

Example 4

The piezoelectric element 110 of the first piezoelectric vibrating body 100a and the piezoelectric element 110 of the second piezoelectric vibrating body 100b have lengths different from each other in at least one direction of the X direction (longitudinal direction) and the Y direction (transverse direction) (not shown).

Example 5

The substrate 120 of the first piezoelectric vibrating body 100a and the substrate 120 of the second piezoelectric vibrating body 100b are disposed in positions deviated from each other in at least one direction of the X direction (longitudinal direction) and the Y direction (transverse direction) (not shown).

Example 6

The substrate 120 of the first piezoelectric vibrating body 100a and the substrate 120 of the second piezoelectric vibrating body 100b have lengths different from each other in at least one direction of the X direction (longitudinal direction) and the Y direction (transverse direction) (not shown).

When the two piezoelectric vibrating bodies 100a and 100b have the asymmetry shown in Examples 1 to 6, it is possible to sufficiently alleviate the concentration of abrasion of the protrusion 20 for the same reason as that described in FIGS. 5A to 7C. In Example 1, Example 3, and Example 5, the deviation amount in the X direction and the deviation amount in the Y direction are respectively preferably in a range of 5 μm to 30 μm and more preferably in a range of 10 μm to 30 μm. In Example 2, Example 4, and Example 6, both the difference in dimensions in the X direction and the difference in dimensions in the Y direction are preferably in a range of 10 μm to 60 μm and more preferably in a range of 20 μm to 60 μm. Both values of the deviation amount and the difference in dimensions are values measured at a room temperature of (20° C.).

As described above, according to the embodiment, since the first piezoelectric vibrating body 100a and the second piezoelectric vibrating body 100b have asymmetry that the first piezoelectric vibrating body 100a and the second piezoelectric vibrating body 100b are asymmetrical to each other with respect to the vibrating plate 200, a position of a contact point where the protrusion 20 comes into contact with a body to be driven (rotor 50) is changed. As a result, it is possible to reduce the concentration of abrasion of the protrusion 20.

Other Embodiments of Piezoelectric Driving Device

Figure 8:
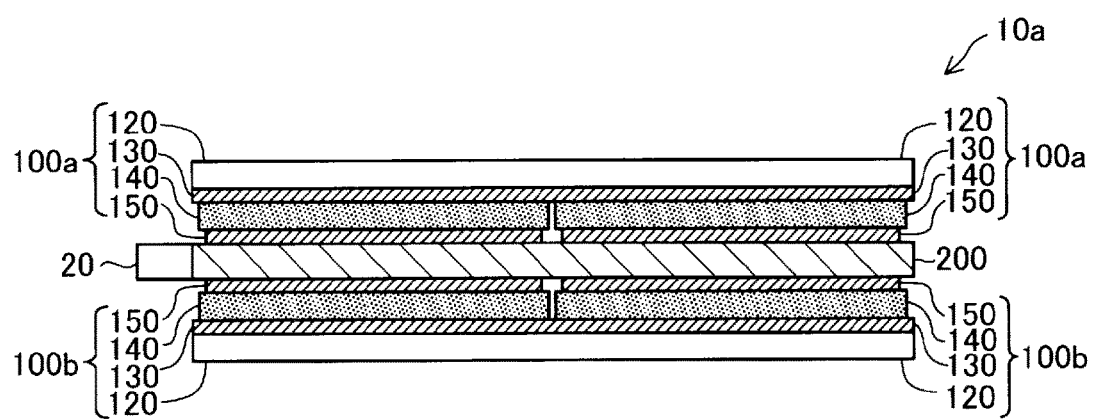
FIG. 8 is a sectional view of a piezoelectric driving device of another embodiment.

FIG. 8 is a sectional view of a piezoelectric driving device 10a as another embodiment of the invention and is a diagram corresponding to FIG. 1B of the first embodiment. In the piezoelectric driving device 10a, the piezoelectric vibrating body 100 is disposed on the vibrating plate 200 in an upside down state of the state of FIG. 1B. That is, herein, the second electrode 150 is close to the vibrating plate 200 and the substrate 120 is disposed to be farthest from the vibrating plate 200. Also in FIG. 8, wiring (or a wiring layer or an insulating layer) for electrically connecting the second electrodes 150a to 150e with each other and wiring (or a wiring layer or an insulating layer) for electrically connecting the first electrode 130, the second electrodes 150a to 150e, and a driving circuit with each other are not shown in the drawing, in the same manner as in FIG. 1B. The piezoelectric driving device 10a can also achieve the same effects as those in the first embodiment.

Figure 9A:
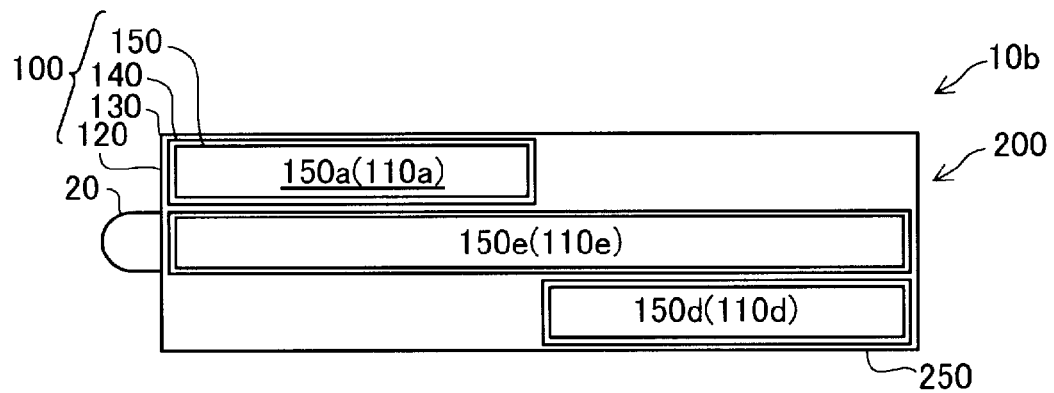
FIGS. 9A to 9C are plan views of a piezoelectric driving device of another embodiment.
Figure 9B:
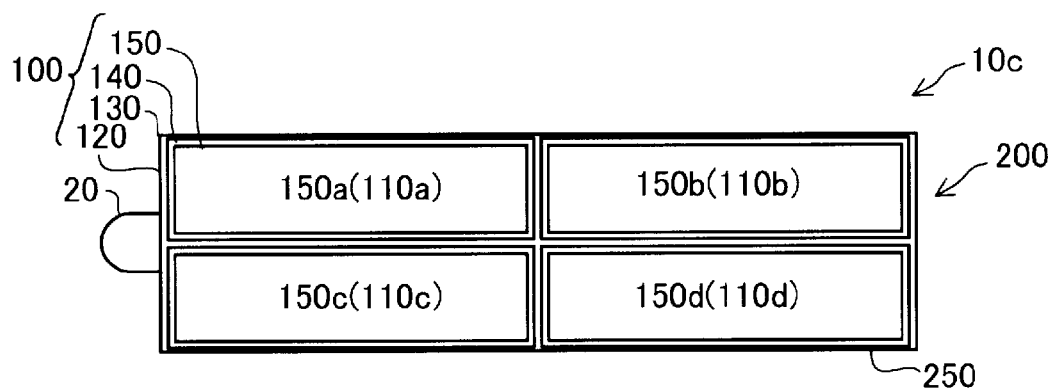
Figure 9C:
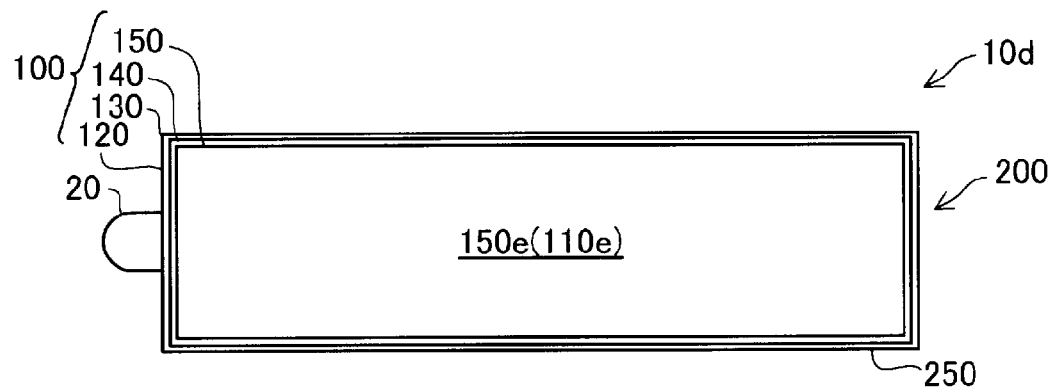

FIG. 9A is a plan view of a piezoelectric driving device 10b as another embodiment of the invention and is a diagram corresponding to FIG. 1A of the first embodiment. In FIGS. 9A to 9C, for convenience of description, the connection portion 220 or the attachment portion 230 of the vibrating plate 200 is omitted. In the piezoelectric driving device 10b of FIG. 9A, the pair of second electrodes 150b and 150c are omitted. This piezoelectric driving device 10b can also rotate the rotor 50 in one direction z as shown in FIGS. 5A to 5C. Since the same voltage is applied to the three second electrodes 150a, 150e, and 150d of FIG. 9A, the three second electrodes 150a, 150e, and 150d may be formed as one connected conductive layer.

FIG. 9B is a plan view of a piezoelectric driving device 10c as still another embodiment of the invention. In the piezoelectric driving device 10c, the second electrode 150e in the center of FIG. 1A is omitted, and the other four second electrodes 150a, 150b, 150c, and 150d are formed in a larger area than that of FIG. 1A. The piezoelectric driving device 10c can also implement substantially the same effects as those of the first embodiment.

FIG. 9C is a plan view of a piezoelectric driving device 10d as still another embodiment of the invention. In the piezoelectric driving device 10d, the four second electrodes 150a, 150b, 150c, and 150d of FIG. 1A are omitted and one second electrode 150e is formed with a large area. The piezoelectric driving device 10d is only expanded or contracted in the longitudinal direction, but it is possible to apply great force from the protrusion 20 to a body to be driven (not shown).

As shown in FIGS. 1A and 1B and FIGS. 9A to 9C, as the second electrode 150 of the piezoelectric vibrating body 100, at least one electrode layer can be provided. However, as shown in FIGS. 1A and 1B and FIGS. 9A to 9C, it is preferable to provide the second electrode 150 in a position diagonal to the rectangular piezoelectric vibrating body 100, because it is possible to deform the piezoelectric vibrating body 100 and the vibrating plate 200 in a meander shape to be curved in the plane thereof.

Embodiment of Apparatus Using Piezoelectric Driving Device

The piezoelectric driving device 10 described above can apply great force to a body to be driven by using resonance, and can be applied to various apparatuses. The piezoelectric driving device 10 can be used as a driving device in various apparatuses such as a robot (including an electronic component conveying apparatus (IC handler)), a pump for medication, a calendar transporting apparatus of a clock, and a printing apparatus (for example, a paper feeding mechanism, however, a vibrating plate is not resonated in a piezoelectric driving device used in a head, and accordingly, the piezoelectric driving device is not applied to a head), for example. Hereinafter, a representative embodiment will be described.

Figure 10:
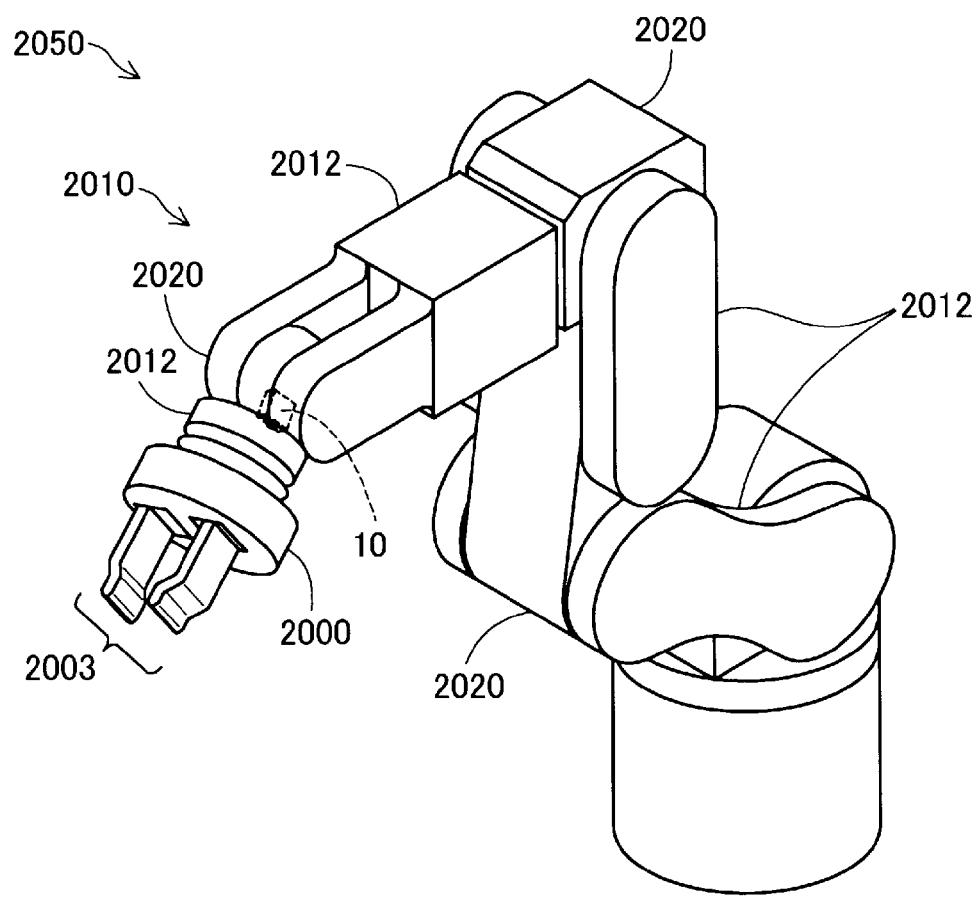
FIG. 10 is an explanatory diagram showing an example of a robot using the piezoelectric driving device.

FIG. 10 is an explanatory diagram showing an example of a robot 2050 using the piezoelectric driving device 10 described above. The robot 2050 includes an arm 2010 (also referred to as an "arm portion") which includes a plurality of linking portions 2012 (also referred to as "linking members") and a plurality of joints 2020 which are connected between the linking portions 2012 to be rotated or curved. The piezoelectric driving device 10 described above is embedded in each joint 2020, and it is possible to rotate or curve the joint 2020 by an arbitrary angle using the piezoelectric driving device 10. A robot hand 2000 is connected to an end of the arm 2010. The robot hand 2000 includes a pair of grasping portions 2003. The piezoelectric driving device 10 is also embedded in the robot hand 2000, and it is possible to open and close the grasping portions 2003 using the piezoelectric driving device 10 to grasp an object. In addition, the piezoelectric driving device 10 is also provided between the robot hand 2000 and the arm 2010, and it is possible to rotate the robot hand 2000 with respect to the arm 2010 using the piezoelectric driving device 10.

Figure 11:
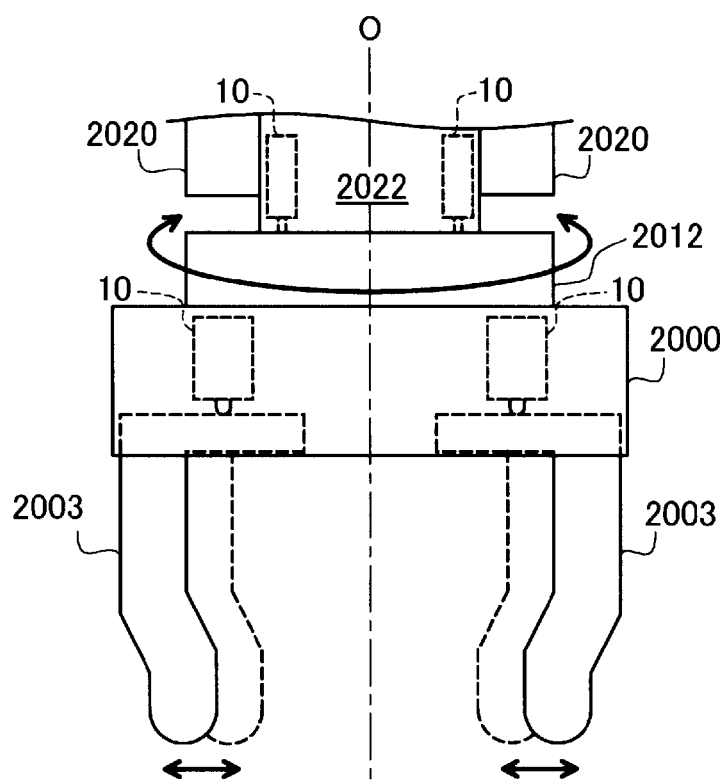
FIG. 11 is an explanatory diagram of a wrist part of a robot.

FIG. 11 is an explanatory diagram of a wrist part of the robot 2050 shown in FIG. 10. The wrist joints 2020 interpose a wrist rotation portion 2022 and a wrist linking portion 2012 is attached to the wrist rotation portion 2022 to be rotated around a center axis O of the wrist rotation portion 2022. The wrist rotation portion 2022 includes the piezoelectric driving device 10, and the piezoelectric driving device 10 rotates the wrist linking portion 2012 and the robot hand 2000 around the center axis O. The plurality of grasping portions 2003 are provided to stand on the robot hand 2000. A proximal end portion of the grasping portion 2003 can move in the robot hand 2000 and the piezoelectric driving device 10 is mounted in a base portion of this grasping portion 2003. Accordingly, by operating the piezoelectric driving device 10, it is possible to grasp a target by moving the grasping portion 2003.

The robot is not limited to a single arm robot, and the piezoelectric driving device 10 can also be applied to a multi-arm robot having two or more arms. Herein, in addition to the piezoelectric driving device 10, an electric power line for applying power to various devices such as a force sensor or a gyro sensor or a signal line for transmitting signals to the devices is included in the wrist joints 2020 or the robot hand 2000, and an extremely large number of wirings is necessary. Accordingly, it is extremely difficult to dispose wirings in the joints 2020 or the robot hand 2000. However, since the piezoelectric driving device 10 of the embodiment described above can decrease a driving current, compared to a general electric motor or a piezoelectric driving device of the related art, it is possible to dispose wirings even in a small space such as the joint 2020 (particularly, a joint on the edge of the arm 2010) or the robot hand 2000.

Figure 12:
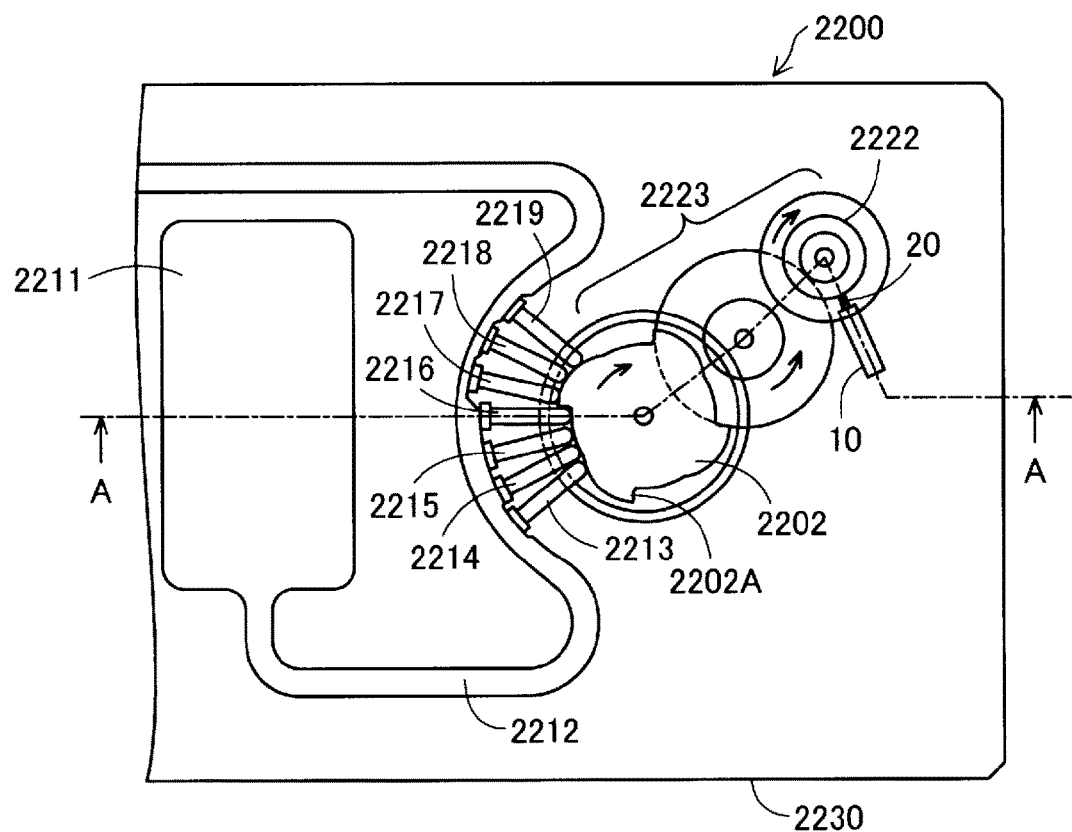
FIG. 12 is an explanatory diagram showing an example of a liquid feeding pump using the piezoelectric driving device.

FIG. 12 is an explanatory diagram showing an example of a liquid feeding pump 2200 using the piezoelectric driving device 10 described above. The liquid feeding pump 2200 includes a reservoir 2211, a tube 2212, the piezoelectric driving device 10, a rotor 2222, a deceleration transmission mechanism 2223, a cam 2202, and a plurality of fingers 2213, 2214, 2215, 2216, 2217, 2218, and 2219 in the case 2230. The reservoir 2211 is an accommodation portion which accommodates liquid which is a transportation target. The tube 2212 is a tube which transports the liquid sent from the reservoir 2211. A protrusion 20 of the piezoelectric driving device 10 is provided in a state of being pressed against a side surface of the rotor 2222 and the piezoelectric driving device 10 rotates the rotor 2222. A rotation force of the rotor 2222 is transmitted to the cam 2202 through the deceleration transmission mechanism 2223. The fingers 2213 to 2219 are members which block the tube 2212. When the cam 2202 is rotated, the fingers 2213 to 2219 are pressed to the outer side in an emission direction in order, by a protrusion 2202A of the cam 2202. The fingers 2213 to 2219 block the tube 2212 in order from the upstream side in a transportation direction (reservoir 2211 side). Accordingly, the liquid in the tube 2212 is transmitted to the downstream side in order. By doing so, it is possible to accurately feed an extremely small amount of liquid and to implement a small liquid feeding pump 2200. The disposition of each member is not limited to that shown in the drawing. The members such as fingers or the like may not be provided and a ball or the like provided on the rotor 2222 may block the tube 2212. The liquid feeding pump 2200 described above can be used as a dosing apparatus which gives medication such as insulin to a human body. Herein, by using the piezoelectric driving device 10 of the embodiment described above, a driving current is decreased, compared to a case of the piezoelectric driving device of the related art, and accordingly, it is possible to decrease power consumption of the dosing apparatus. Accordingly, when the dosing apparatus is driven with a battery, the effects are particularly effective.

Modification Examples

The invention is not limited to the examples or embodiments described above and can be implemented in various forms within a range not departing from a gist thereof, and the following modifications can also be performed, for example.

Modification Example 1

In the embodiment, the first electrode 130, the piezoelectric body 140, and the second electrode 150 are formed on the substrate 120, but the substrate 120 may be omitted and the first electrode 130, the piezoelectric body 140, and the second electrode 150 may be formed on the vibrating plate 200.

Hereinabove, the embodiments of the invention have been described based on some examples, but the embodiments of the invention are for easy understanding of the invention and not for limiting the invention. The invention can include modifications, improvement, and equivalents to the invention, without departing from a gist and a scope of the aspects.

The entire disclosure of Japanese Patent Application No. 2014-164630, filed Aug. 13, 2014 is expressly incorporated by reference herein.

What is claimed is:

1. A piezoelectric driving device comprising:
   a vibrating plate including a first surface and a second surface;
   a first piezoelectric vibrating body which includes a first piezoelectric element and is disposed on the first surface of the vibrating plate;
   a second piezoelectric vibrating body which includes a second piezoelectric element and is disposed on the second surface of the vibrating plate; and
   a protrusion which is provided on the vibrating plate and comes into contact with a body to be driven
   wherein the first piezoelectric vibrating body and the second piezoelectric vibrating body have asymmetry that the first piezoelectric vibrating body and the second piezoelectric vibrating body are asymmetrical to each other with respect to the vibrating plate.

2. The piezoelectric driving device according to claim 1, wherein, when a longitudinal direction is set as a first direction and a transverse direction is set as a second direction orthogonal to the first direction with respect to the first piezoelectric vibrating body, the vibrating plate, and the second piezoelectric vibrating body the asymmetry of the first piezoelectric vibrating body and the second piezoelectric vibrating body includes a case where the first piezoelectric vibrating body and the second piezoelectric vibrating body are disposed in positions deviated from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

3. The piezoelectric driving device according to claim 2, wherein the asymmetry of the first piezoelectric vibrating body and the second piezoelectric vibrating body includes a case where the first piezoelectric vibrating body and the second piezoelectric vibrating body are disposed in positions deviated from each other by 5 μm to 30 μm in the first direction.

4. The piezoelectric driving device according to claim 2, wherein the asymmetry of the first piezoelectric vibrating body and the second piezoelectric vibrating body includes a case where the first piezoelectric vibrating body and the second piezoelectric vibrating body are disposed in positions deviated from each other by 5 μm to 30 μm in the second direction.

5. The piezoelectric driving device according to claim 1, wherein, when a longitudinal direction is set as a first direction and a transverse direction is set as a second direction orthogonal to the first direction with respect to the first piezoelectric vibrating body, the vibrating plate, and the second piezoelectric vibrating body,
the asymmetry of the first piezoelectric vibrating body and the second piezoelectric vibrating body includes a case where the first piezoelectric element and the second piezoelectric element are disposed in positions deviated from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

6. The piezoelectric driving device according to claim 1, wherein, when a longitudinal direction is set as a first direction and a transverse direction is set as a second direction orthogonal to the first direction with respect to the first piezoelectric vibrating body, the vibrating plate, and the second piezoelectric vibrating body,
the asymmetry of the first piezoelectric vibrating body and the second piezoelectric vibrating body includes a case where the first piezoelectric element and the second piezoelectric element have lengths different from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

7. The piezoelectric driving device according to claim 1, wherein the first piezoelectric vibrating body includes a first substrate and the first piezoelectric element which is formed on the first substrate,
the second piezoelectric vibrating body includes a second substrate and the second piezoelectric element which is formed on the second substrate, and
when a longitudinal direction is set as a first direction and a transverse direction is set as a second direction orthogonal to the first direction with respect to the first piezoelectric vibrating body, the vibrating plate, and the second piezoelectric vibrating body,
the asymmetry of the first piezoelectric vibrating body and the second piezoelectric vibrating body includes a case where the first substrate and the second substrate are disposed in positions deviated from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

8. The piezoelectric driving device according to claim 1, wherein the first piezoelectric vibrating body includes a first substrate and the first piezoelectric element which is formed on the first substrate,
the second piezoelectric vibrating body includes a second substrate and the second piezoelectric element which is formed on the second substrate, and
when a longitudinal direction is set as a first direction and a transverse direction is set as a second direction orthogonal to the first direction with respect to the first piezoelectric vibrating body, the vibrating plate, and the second piezoelectric vibrating body,
the asymmetry of the first piezoelectric vibrating body and the second piezoelectric vibrating body includes a case where the first substrate and the second substrate have lengths different from each other in at least one direction of the first direction and the second direction when a laminated structure configured with the first piezoelectric vibrating body, the vibrating plate, and the second piezoelectric vibrating body is seen in a third direction which is a lamination direction of the laminated structure.

9. The piezoelectric driving device according to claim 1, wherein the piezoelectric body has a thickness of 0.5 μm to 20 μm.

10. The piezoelectric driving device according to claim 1, wherein the piezoelectric body has a thickness of 0.5 μm to 3 μm.

11. A robot comprising:
a plurality of linking portions;
joints connected to the plurality of linking portions; and
the piezoelectric driving device according to claim 1 which is curved with the plurality of linking portions using the joints.

12. A robot comprising:
a plurality of linking portions;
joints connected to the plurality of linking portions; and
the piezoelectric driving device according to claim 2 which is curved with the plurality of linking portions using the joints.

13. A robot comprising:
a plurality of linking portions;
joints connected to the plurality of linking portions; and
the piezoelectric driving device according to claim 3 which is curved with the plurality of linking portions using the joints.

14. A driving method of the robot according to claim 11, wherein a driving circuit of the piezoelectric driving device applies an AC voltage or a voltage obtained by applying an offset voltage to the AC voltage as a driving voltage between the first piezoelectric element and the second piezoelectric element of the piezoelectric driving device, to curve the plurality of linking portions using the joints.

15. An electronic component conveying apparatus comprising:
- a grasping device which grasps an electronic component;
- at least a stage which moves the grasping device; and
- the piezoelectric driving device according to claim 1 which moves the stage.

16. An electronic component conveying apparatus comprising:
- a grasping device which grasps an electronic component;
- at least a stage which moves the grasping device; and
- the piezoelectric driving device according to claim 2 which moves the stage.

17. An electronic component conveying apparatus comprising:
- a grasping device which grasps an electronic component;
- at least a stage which moves the grasping device; and
- the piezoelectric driving device according to claim 3 which moves the stage.

18. A driving method of the piezoelectric driving device according to claim 1, comprising:
- applying an AC voltage or a voltage obtained by applying an offset voltage to the AC voltage as a driving voltage between the first piezoelectric element and the second piezoelectric element of the piezoelectric driving device.

19. A driving method of the piezoelectric driving device according to claim 2, comprising:
- applying an AC voltage or a voltage obtained by applying an offset voltage to the AC voltage as a driving voltage between the first piezoelectric element and the second piezoelectric element of the piezoelectric driving device.

20. A driving method of the piezoelectric driving device according to claim 3, comprising:
- applying an AC voltage or a voltage obtained by applying an offset voltage to the AC voltage as a driving voltage between the first piezoelectric element and the second piezoelectric element of the piezoelectric driving device.

* * * * *